Sept. 17, 1940. W. M. VOGEL 2,215,113
BAKING PAN CONSTRUCTION
Filed Jan. 27, 1940
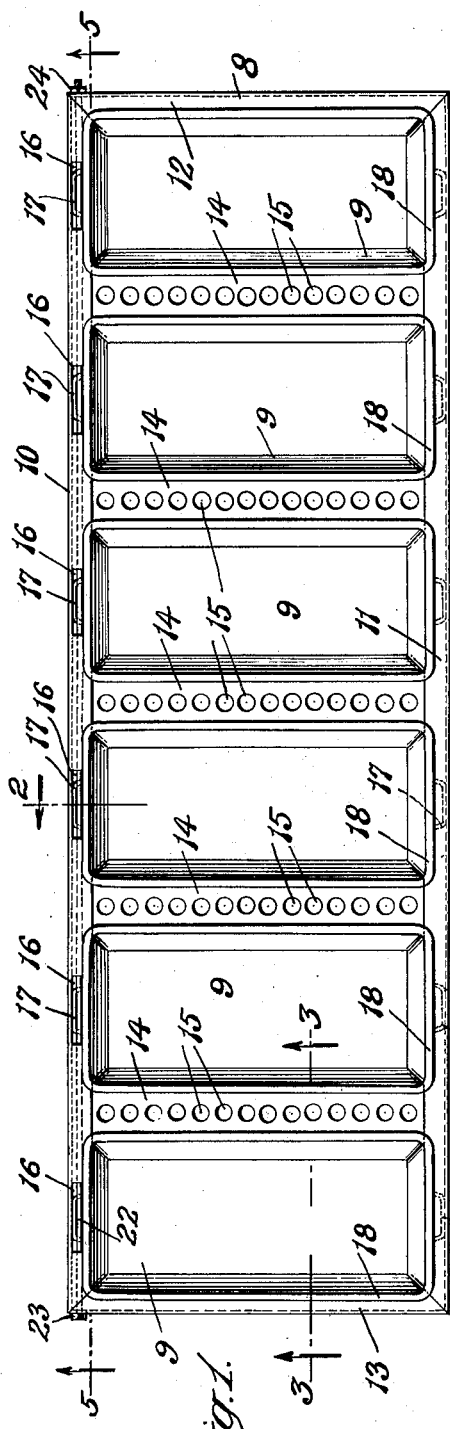
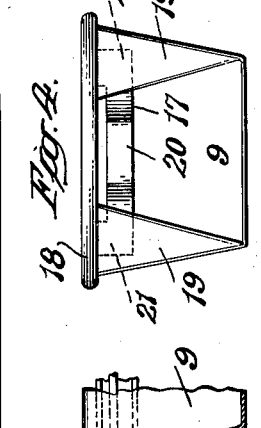
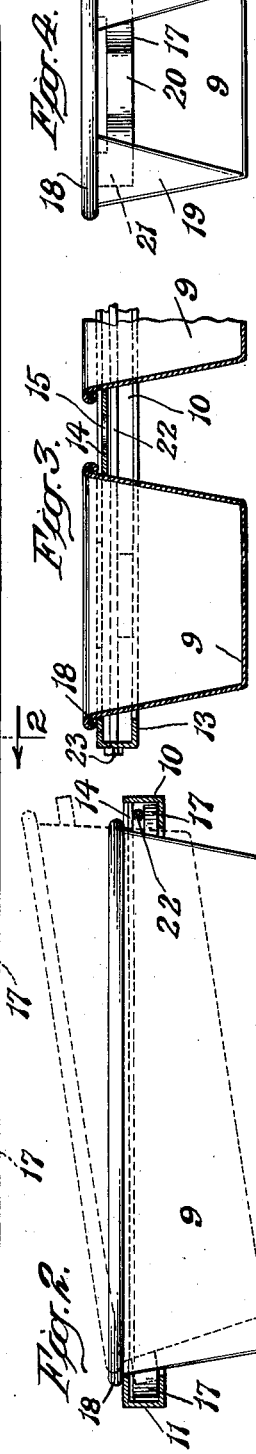
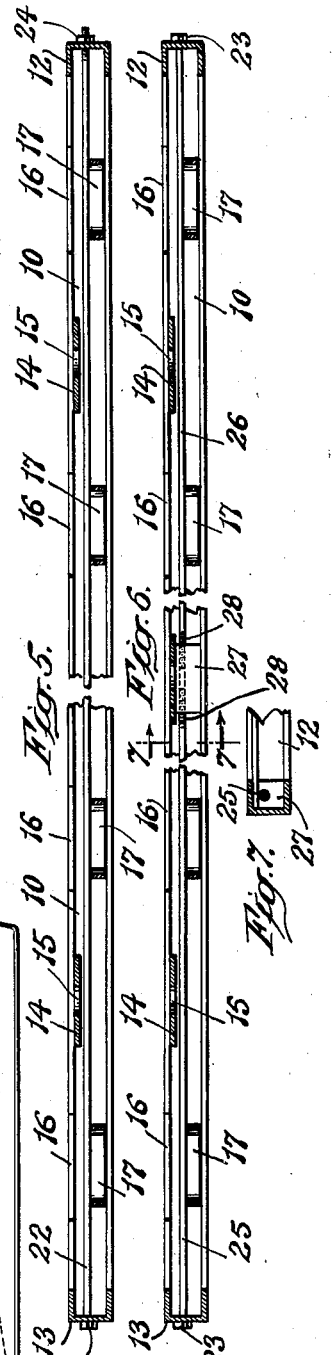
INVENTOR
William Martin Vogel
BY
Harry Radzinsky
ATTORNEY Patented Sept. 17, 1940

2,215,113

UNITED STATES PATENT OFFICE 2,215,113

BAKING PAN CONSTRUCTION

William Martin Vogel, Bloomfield, N. J.

Application January 27, 1940, Serial No. 315,881

10 Claims. (Cl. 53—6)

This invention relates to baking pans or similar receptacles, and more particularly to those employed in bakeries where a group of the pans are held together as a unit in a frame.

At the present time, a number of the pans, each of which is used to bake a loaf of bread or the like, are permanently secured as by spot welding, in a rigid frame, of which they thereby become for all intents and purposes, a substantially integral part. Usually the pans are held together in groups of six or more, and since the pans are permanently secured within the rigid metal frame, it is necessary, when one of the pans becomes damaged or otherwise unfit for use, to discard the entire unit or group of pans, including also the frame in which the pans are secured.

The present invention therefore has for its object the provision of a pan-supporting frame within which a plurality of baking pans are adapted to be securely held as a unit, yet are so held as to be capable of being independently removed and replaced when necessary. With such an arrangement, any pan in the group can, when worn out or damaged, be removed and replaced without disturbing the others in the group. As a matter of fact, since all of the pans are detachably mounted in the improved supporting frame, they can all be removed and replaced whenever desired, so that the frame in which the pans are mounted and in which new pans can be replaced, can be used indefinitely.

A further object of the invention is to provide a supporting frame for a plurality of baking pans, said frame and the pans supported therein in side-by-side relationship, being provided with co-operating means by which the pans are securely, yet removably, held in the frame and the frame and the pans held therein may be handled as a unit.

More particularly, the invention contemplates the provision of a frame in which a plurality of baking pans are mounted in side-by-side and spaced relationship, the frame having channels into which projecting elements on the ends of the pans extend, and it further contemplates the provision of locking means extending through at least one of the channels and overlying the projections on the pans and holding the same from raising movement out of the channel.

In the accompanying drawing, wherein several embodiments of the invention are shown, Fig. 1 is a plan view of a plurality of baking pans held in the improved holder; Fig. 2 is a sectional view on the line 2—2 of Fig. 1, looking in the direction of the arrows; Fig. 3 is a sectional view on the line 3—3 of Fig. 1, looking in the direction of the arrows; Fig. 4 is an end view of one of the baking pans; Fig. 5 is a sectional view on the line 5—5 of Fig. 1, looking in the direction of the arrows; Fig. 6 is a sectional view similar to Fig. 5, but of a modified construction, and Fig. 7 is a sectional view on the line 7—7 of Fig. 6, looking in the direction of the arrows.

With reference to the structure shown in Figs. 1 to 5 inclusive, 8 indicates a frame in which a number of the baking pans 9 are adapted to be securely, yet removably held. The frame 8 consists primarily of a pair of spaced parallel, longitudinal side bars 10 and 11 connected at their ends by the end bars 12 and 13. The longitudinal bars 10 and 11 are connected together at uniformly spaced points by spacing bars 14, said spacing bars serving to divide the frame into compartments, into each of which one of the baking pans 9 is fitted. In order to permit the free passage of heat around the sides of the pans, the separating bars 14 are provided with a plurality of holes as indicated at 15. The frame described is a strong, rigid structure capable of withstanding rough handling and serving to protect the pans held by it.

The longitudinal or side bars 10 and 11, as well as the end bars 12 and 13 of the frame, are composed of channel metal, and at spaced points, the top flange of the bar 10 is cut away or apertured as at 16 so that projections or lugs 17 provided on one end of each of the baking pans, may descend into position within the channel in the longitudinal bar 10.

Each of the baking pans 9 is made of sheet metal and is provided in the conventional way with a rolled top or rim 18, which when the pan is placed within one of the compartments of the frame 8, comes to rest upon the top flanges of the longitudinal bars 10 and 11 as well as upon the top of the separating bars 14. As each of its ends the pan is provided with turned-over wings 19. The projections or lugs 17 provided on each end of the pan, have a central projecting portion 20 (Fig. 4) and end wings 21 which extend under the wings 21 and are welded thereunder whereby the lugs or projections are firmly attached to the ends of the pan.

The manner in which each of the baking pans is inserted within the frame 8 is clearly shown in Fig. 2. The pan is first inserted angularly, as shown in dotted lines, and since the open sides of the channel bars 10 and 11 face inwardly or towards the inside of the frame, one of the projections or lugs 17 on the pan slides easily into the channel in the longitudinal bar 11. The lug or projection 17 on the opposite end of the pan enters into the channel in the bar 10 by descent through the aperture 16 in said bar.

A locking means is provided for holding the pans within the frame, said locking means consisting of a rod 22 which extends for the entire length of the channel in the bar 10 and overlies the projections or lugs 17 on the several pans in the frame, that are disposed within the channel, thereby holding said lugs against raising movement. The rod is provided with a head 23 on one of its ends and a nut 24 threaded on its opposite end. By removal of the nut, the rod may be slid lengthwise and withdrawn from the channel in the bar 10 so that any one or all of the pans may be thus easily lifted out of the frame for replacement. The end bars 12 and 13, are of course, provided with holes through which the locking rod 22 may be easily slid lengthwise when desired.

With the arrangement disclosed, a plurality of pans may be held together in a sturdy proteective frame as a unit, yet any one or all of the pans may be instantly removed and replaced by removal of the locking rod.

In Fig. 6 is shown a modified structure, wherein two locking rods 25 and 26 are employed in place of the single rod 22. The end of each of the rods 25, 26 is threaded as indicated at 28, for reception into a threaded block 29 or casting, which is fixed in the channel in the bar 10 at a substantially central point. In this arrangement, the possibility of a single lengthy rod such as shown at 22, warping under the intense heat to which it is subjected, is avoided, since two separate rods, each entrant into the frame from the opposite ends thereof is employed.

This and other modifications may be readily made without departing from the spirit of the invention.

What I claim is:

1. A device of the character described comprising a frame, a plurality of pans in side-by-side relationship located within said frame and surrounded thereby, the pans being independently removable from the frame, and single means for holding all of the pans in the frame, said means being releasable to permit simultaneous disengagement of all of the pans from the frame.

2. A device of the character described comprising, a plurality of baking pans disposed in side-by-side relationship, a frame extending around all of said pans, said frame including spacing elements located between the pans and holding the same in spaced relationship, the frame having channels located at the opposite ends of the pans, the ends of the pans having projections entering into said channels, and a removable rod extending through one of the channels and overlying the projections on one end of each pan to hold that end of the pan from rising out of said channel, said channel having apertured portions through which the projections may be raised when the rod is removed from its position in the channel.

3. A device of the character described comprising, a pan-holding frame, said frame having spaced bars provided with longitudinal channels, a pan for fitment within said frame, said pan having a projection on each of its ends for location in one of the channels, one of the bars being apertured to permit passage of one of the projections into it to reach the channel therein, and a removable locking element extending longitudinally of the last-mentioned channel and overlying the projection extending from the pan and entering therein, to thereby prevent movement of said projection out of the channel.

4. A device of the character described comprising, a frame adapted to surround a plurality of baking pans, said frame having a side bar provided with a channel, each baking pan having a projection adapted to be located in said channel, and a removable rod extending lengthwise of the channel and overlying the projections on the pans to thereby hold the pans against raising movement out of the frame.

5. A device of the character described comprising, a frame adapted to surround a plurality of baking pans, said frame having a side bar provided with a channel, each baking pan having a projection adapted to be located in said channel, a removable rod extending lengthwise of the channel and overlying the projections on the pans to thereby hold the pans against raising movement out of the frame, the side bar having spaced apertures through which the projections may be moved to lift the pans out of the frame when the rod is not in position in the channel.

6. A device of the character described comprising, a frame adapted to surround a plurality of baking pans and hold the same together as a unit, said frame having a side bar provided with a longitudinal channel, each baking pan having a projection adapted to be located within said channel, and a pair of removable rods in said channel overlying the projections on the pans to thereby hold the pans against raising movement out of the frame, and means intermediate of the ends of the frame for detachably engaging the inner ends of said rods.

7. A device of the character described comprising, a frame adapted to surround a plurality of baking pans, said frame having a side bar provided with a channel, each baking pan having a projection adapted to be located in said channel, and a rod extending through the channel from one end of the same to the other end and overlying the projections therein to thereby prevent raising movement of the projections out of the channel, the side bar having spaced apertures through which the projections may be moved when the rod is not in place in the channel.

8. A device of the character described comprising, a frame adapted to surround a plurality of baking pans disposed in spaced, side-by-side relationship, said frame including spaced parallel side bars located below the rims of the baking pans, each of said bars having a channel provided with an open side disposed toward the inside of the frame, each pan having a projection on its opposite ends for fitment within the respective channels, at least one of the side bars being provided with apertures through which one of the projections on each pan may enter or be removed from the channel in the apertured bar, and means operating in the apertured bar for engaging the projections disposed in the channel thereof to prevent raising movement of said projections out of the channel through the apertures, said means being manually releasable.

9. A device of the character described comprising, a baking pan having a rolled rim, projections on the ends of said pan below the rim, a frame for the reception of said pan and a plurality of similar pans, the frame extending around the pan below the rim and having channels into which the projections fit, one of said channels having apertured portions to permit entry and removal of one of the projections out of the apertured channel, and a locking member in the apertured channel extending between the projection and rim to hold the projection from rising out of the aperture.

10. A device of the character described comprising, a substantially rectangular frame for holding a plurality of baking pans in side-by-side relationship, the frame extending around the pans, each of the pans having a rolled top resting on top of the frame, each of the pans having a projection on its opposite ends, parts of the frame being channelled and receiving the projections in said channels, one of the channelled frame parts having apertures through which one of the projections on each pan is passed to enter into the channel in said frame part, and a single removable locking member for engaging all of the projections in the apertured frame part to hold said projections from movement out of the channel therein.

WILLIAM MARTIN VOGEL.